(12) United States Patent
Unno et al.

(10) Patent No.: US 6,490,042 B1
(45) Date of Patent: Dec. 3, 2002

(54) WAVE METER FOR MEASURING THE WAVELENGTH OF AN OPTICAL WAVELENGTH DIVISION MULTIPLEXED SIGNAL

(75) Inventors: Yasushi Unno, Tokyo (JP); Shiori Sasaki, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 195 days.

(21) Appl. No.: 09/636,151

(22) Filed: Aug. 10, 2000

(30) Foreign Application Priority Data

Aug. 26, 1999 (JP) .......................................... 11-240568
Aug. 26, 1999 (JP) .......................................... 11-240569

(51) Int. Cl.[7] ................................................ G01B 9/02
(52) U.S. Cl. ...................................................... 356/451
(58) Field of Search ................................. 356/310, 451, 356/326, 328, 73.1, 450

(56) References Cited

U.S. PATENT DOCUMENTS 5,796,479 A * 8/1998 Derickson et al. .......... 356/326

* cited by examiner

Primary Examiner—Samuel A. Turner
Assistant Examiner—Patrick Connolly
(74) Attorney, Agent, or Firm—Fish & Richardson P.C.

(57) ABSTRACT

A wave meter 1 is a wave meter for measuring and monitoring the wavelength of an optical signal, etc., in WDM transmission. After a monitor reference wave is input and set, the monitor reference wave is always compared with the signal wave being transmitted in WDM, thereby monitoring an anomaly occurring in the optical signal being transmitted in the WDM.

13 Claims, 8 Drawing Sheets

WAVE METER FOR MEASURING THE WAVELENGTH OF AN OPTICAL WAVELENGTH DIVISION MULTIPLEXED SIGNAL

BACKGROUND OF THE INVENTION

1. Field of the invention

This invention relates to a wave meter for measuring the wavelength of an optical signal multiplexed in WDM (Wavelength Division Multiplexing), etc., 2. Description of the Related Art In recent years, developments in the information communication field typified by the Internet, portable telephones, etc., have been remarkable, and the amount of information on a transmission line has been dramatically increased accordingly. An optical fiber can be named as one of the transmission lines supporting the information communication field as the core therefor. Optical fiber cables are already laid in the ground and on the seal bottom and are actually used. However, to cope with a rapid increase in the communication traffic, means for enabling high-speed and large-capacity transmission using the already existing optical fiber cables is demanded in addition to installation of additional optical fiber cables. WDM technology is one of the means.

The WDM is a system using the property of light having one wavelength not interfering with light having a different wavelength to transmit a plurality of optical signals different in wavelength at the same time, thereby using one optical fiber in a multiplexing manner. In a conventional system using a single wavelength, a transmission capacity of 2.5 to 10 Gbps is a limit; however, the WDM can provide a transmission capacity at a terabit level by performing 128 multiplexing of signal transmitted at 10 Gbps, for example.

To put the transmission using the WDM, which will be hereinafter called WDM transmission, to use, a machine for evaluating the transmission characteristic at the WDM transmission time with high precision is required. Then, a wave meter called an optical spectrum analyzer for measuring and analyzing the spectra of a plurality of optical signals is developed as such a machine.

Hitherto, such a wave meter has not been provided with a function of monitoring the communication state during the WDM transmission and issuing a warning if an abnormal state is detected. However, if the wavelength of an optical signal, etc., varies beyond the range in the specifications in the WDM transmission, the signal quality in the reception section is degraded remarkably. Thus, it is necessary to monitor multiplexed optical signal in the WDM transmission with a plurality of optical signals multiplexed.

SUMMARY OF THE INVENTION

It is therefore an object of the invention to provide a wave meter for monitoring optical signals multiplexed in WDM transmission, etc.

According to a first aspect of the invention, there is provided a wave meter for measuring transmitted signal light comprising a plurality of optical signals multiplexed by a predetermined system (for example, WDM), the wave meter comprising:

reference setting means (for example, CPU 6 in FIG. 1; step S2 in FIG. 4) for setting a measurement reference of the signal light based on the predetermined system;

variation amount setting means (for example, CPU 6 in FIG. 1; step S1 in FIG. 4) for setting an allowable variation amount of the signal light at the transmission time;

measurement means (for example, CPU 6 in FIG. 1; step S3 in FIG. 4) for continuously measuring the transmitted signal light; and determination means (for example, CPU 6 in FIG. 1; step S4 in FIG. 4) for determining whether or not the measurement result of the signal light provided by the measurement means is within the range of the allowable variation amount set by the variation amount setting means relative to the measurement reference set by the reference setting means, characterized in that if the determination means does not determine that the signal light is within the range of the allowable variation amount relative to the measurement reference, an anomaly of the signal light is detected.

According to the first aspect of the invention, in the wave meter for measuring transmitted signal light comprising a plurality of optical signals multiplexed by a predetermined system, the reference setting means sets a measurement reference of the signal light based on the predetermined system, the variation amount setting means sets an allowable variation amount of the signal light at the transmission time, the measurement means continuously measures the transmitted signal light, the determination means determines whether or not the measurement result of the signal light provided by the measurement means is within the range of the allowable variation amount set by the variation amount setting means relative to the measurement reference set by the reference setting means, and if the determination means does not determine that the signal light is within the range of the allowable variation amount relative to the measurement reference, an anomaly of the signal light is detected.

Whether or not the signal light continuously measured by the measurement means is within the range of the allowable variation amount relative to the measurement reference is determined, so that a wave meter for checking whether or not transmission is executed within the range in the specifications of the predetermined system can be provided, for example.

According to a second aspect of the invention, in the wave meter of the first aspect, the reference setting means may set the measurement reference of each of the optical signals multiplexed into the signal light, the variation amount setting means may set the allowable variable amount of each of the optical signals multiplexed into the signal light, the measurement means may continuously measure the transmitted signal light and determines each of the optical signals multiplexed into the signal light, and the determination means may determine whether or not each optical signal determined by the measurement means is within the range of each corresponding allowable variation amount set by the variation amount setting means relative to each corresponding measurement reference set by the reference setting means.

According to the second aspect of the invention, in addition to the advantage of the first aspect of the invention, each of the optical signals multiplexed is monitored, so that more detailed monitor can be executed for determining an optical signal in which an anomaly occurs, for example, and a message indicating the fact can be displayed. In this case, various actions can be taken; for example, the abnormal optical signal is removed, only the normal optical signals are multiplexed, and the transmission is continued.

According to a third aspect of the invention, in the wave meter of the second aspect, the reference setting means may set the power amount (power) of each optical signal as the measurement reference of each of the optical signals multiplexed into the signal light, and the variation amount setting means may set the allowable variation amount of the power amount of each of the optical signals multiplexed into the signal light.

According to a fourth aspect of the invention, in the wave meter of the second aspect, the reference setting means may set the wavelength of each optical signal as the measurement reference of each of the optical signals multiplexed into the signal light, and the variation amount setting means may set the allowable variation amount of the wavelength of each of the optical signals multiplexed into the signal light.

In the third or fourth aspect of the invention, the measurement reference and the allowable variation amount are the power amount or the wavelength of each optical signal. Thus, it is made possible to set the measurement reference and the allowable variation amount using a waveform graph of optical signal with the power amount on the vertical axis and the wavelength on the horizontal axis, for example.

Further, according to a fifth aspect of the invention, in the wave meter of first to fourth aspects, the reference setting means may set the measurement reference of the signal light based on measurement reference light (for example, monitor reference wave) of signal light based on the predetermined system input.

In the fifth aspect of the invention, the measurement reference light is input, whereby the measurement reference can be set easily.

According to a sixth aspect of the invention, in the wave meter of the first to fifth aspects of the invention, multiplexing the optical signals by the predetermined system may be WDM.

In the sixth aspect of the invention, a wave meter applied to the WDM used as multiplexing of optical signals can be provided.

According to a seventh aspect of the invention, there is provided a wave meter for measuring transmitted signal light comprising a plurality of optical signals multiplexed by a predetermined system, the wave meter comprising:

setting means (for example, CPU 6 in FIG. 1; step S1 in FIG. 7) for setting an allowable variation amount relative to the wavelength interval between the optical signals multiplexed into the signal light;

measurement means (for example, CPU 6 in FIG. 1; step S2 in FIG. 7) for continuously measuring the transmitted signal light;

specification means (for example, CPU 6 in FIG. 1; step S2 in FIG. 7) for specifying each of the optical signals multiplexed into the signal light based on the measurement result of the signal light provided by the measurement means; and determination means (for example, CPU 6 in FIG. 1; step S3 in FIG. 7) for determining whether or not the wavelength interval between the optical signals specified by the specification means is within the range of the allowable variation amount set by the setting means, characterized in that if the determination means does not determine that the wavelength interval between the optical signals is within the range of the allowable variation amount set by the setting means, an anomaly of the signal light is detected.

In the wave meter of the first aspect for measuring transmitted signal light comprising a plurality of optical signals multiplexed by a predetermined system, the setting means sets an allowable variation amount relative to the wavelength interval between the optical signals multiplexed into the signal light, the measurement means continuously measures the transmitted signal light, the specification means specifies each of the optical signals multiplexed into the signal light based on the measurement result of the signal light provided by the measurement means, the determination means determines whether or not the wavelength interval between the optical signals specified by the specification means is within the range of the allowable variation amount set by the setting means, and if the determination means does not determine that the wavelength interval between the optical signals is within the range of the allowable variation amount set by the setting means, an anomaly of the signal light is detected.

According to an eighth aspect of the invention, there is provided a wave meter for measuring transmitted signal light comprising a plurality of optical signals multiplexed by a predetermined system, the wave meter comprising:

setting means (for example, CPU 6 in FIG. 1; step S1 in FIG. 7) for setting an allowable variation amount relative to the wavelengths of the optical signals multiplexed into the signal light;

measurement means (for example, CPU 6 in FIG. 1; step S2 in FIG. 7). for continuously measuring the transmitted signal light;

specification means (for example, CPU 6 in FIG. 1; step S2 in FIG. 7) for specifying each. of the optical signals multiplexed into the signal light based on the measurement result of the signal light provided by the measurement means; and determination means (for example, CPU 6 in FIG. 1; step S4 in FIG. 7) for determining whether or not the wavelength of each optical signal specified by the specification means is within the range of the allowable variation amount set by the setting means, characterized in that if the determination means does not determine that the wavelength of each optical signal is within the range of the allowable variation amount set by the setting means, an anomaly of the signal light is detected.

In the wave meter of the eighth aspect for measuring transmitted signal light comprising a plurality of optical signals multiplexed by a predetermined system, the setting means sets an allowable variation amount relative to the wavelengths of the optical signals multiplexed into the signal light, the measurement means continuously measures the transmitted signal light, the specification means specifies each of the optical signals multiplexed into the signal light based on the measurement result of the signal light provided by the measurement means, the determination means determines whether or not the wavelength of each optical signal specified by the specification means is within the range of the allowable variation amount set by the setting means, and if the determination means does not determine that the wavelength of each optical signal is within the range of the allowable variation amount set by the setting means, an anomaly of the signal light is detected.

According to a ninth aspect of the invention, there is provided a wave meter for measuring transmitted signal light comprising a plurality of optical signals multiplexed by a predetermined system, the wave meter comprising:

setting means (for example, CPU 6 in FIG. 1; step S1 in FIG. 7) for setting allowable variation amounts relative to the wavelength interval between the optical signals multiplexed into the signal light and the wavelengths of the optical signals;

measurement means (for example, CPU 6 in FIG. 1; step S2 in FIG. 7) for continuously measuring the transmitted signal light;

specification means (for example, CPU 6 in FIG. 1; step S2 in FIG. 7) for specifying each of the optical signals multiplexed into the signal light based on the measurement result of the signal light provided by the measurement means; and determination means (for example, CPU 6 in FIG. 1; steps S3 and S4 in FIG. 7) for determining whether or not the wavelength interval between the optical signals specified by the specification means and the wavelength of each optical signal specified by the specification means are within the range of the allowable variation amounts set by the setting means, characterized in that if the determination means does not determine that the wavelength of each optical signal is within the range of the allowable variation amount set by the setting means, an anomaly of the signal light is detected.

In the wave meter of the ninth aspect for measuring transmitted signal light comprising a plurality of optical signals multiplexed by a predetermined system, the setting means sets allowable variation amounts relative to the wavelength interval between the optical signals multiplexed into the signal light and the wavelengths of the optical signals, the measurement means continuously measures the transmitted signal light, the specification means specifies each of the optical signals multiplexed into the signal light based on the measurement result of the signal light provided by the measurement means, the determination means determines whether or not the wavelength interval between the optical signals specified by the specification means and the wavelength of each optical signal specified by the specification means are within the range of the allowable variation amounts set by the setting means, and if the determination means does not determine that the wavelength of each optical signal is within the range of the allowable variation amount set by the setting means, an anomaly of the signal light is detected.

According to the seventh to ninth aspects of the invention, the wave meter for checking whether or not the wavelength interval between the optical signals multiplexed is a predetermined interval and whether or not each optical signal has a predetermined wavelength can be provided.

In the wave meter of a tenth aspect of the invention, if an anomaly of the signal light is detected, an external system may be informed of the anomaly (for example, step S5 or S7 in FIG. 7).

According to the tenth aspect the invention, a wave meter can be provided for providing information in such a manner that an alarm message is displayed on the display section or a beeper produces a sound, for example, if an anomaly of the signal light is detected.

For example, to install the wave meter incorporating the invention at a relay base of an optical fiber cable, etc., it is necessary to monitor the state of an optical signal at a remote location. Thus, an external information unit may be provided for providing a notification of an anomaly using wireless communications or the optical fiber cable under monitor.

According to an eleventh aspect of the invention, multiplexing the optical signals by the predetermined system may be WDM.

According to the eleventh aspect of the invention, a wave meter applied to the WDM used as multiplexing of optical signals can be provided.

DETAILED DESCRIPTION OF THE PRESENT INVENTION

First Embodiment

Referring now to FIGS. 1 to 4, a first embodiment of a wave meter 1 incorporating the invention will be shown.

First, the configuration of the wave meter 1 will be discussed.

The wave meter 1 incorporating the invention is a wave meter for measuring and monitoring the wavelength of an optical signal, etc., in WDM transmission and is an apparatus for always comparing a monitor reference wave with the signal wave being transmitted in the WDM after the monitor reference signal is input and set, thereby monitoring an anomaly occurring in the optical signal being transmitted in the WDM.

Figure 1:
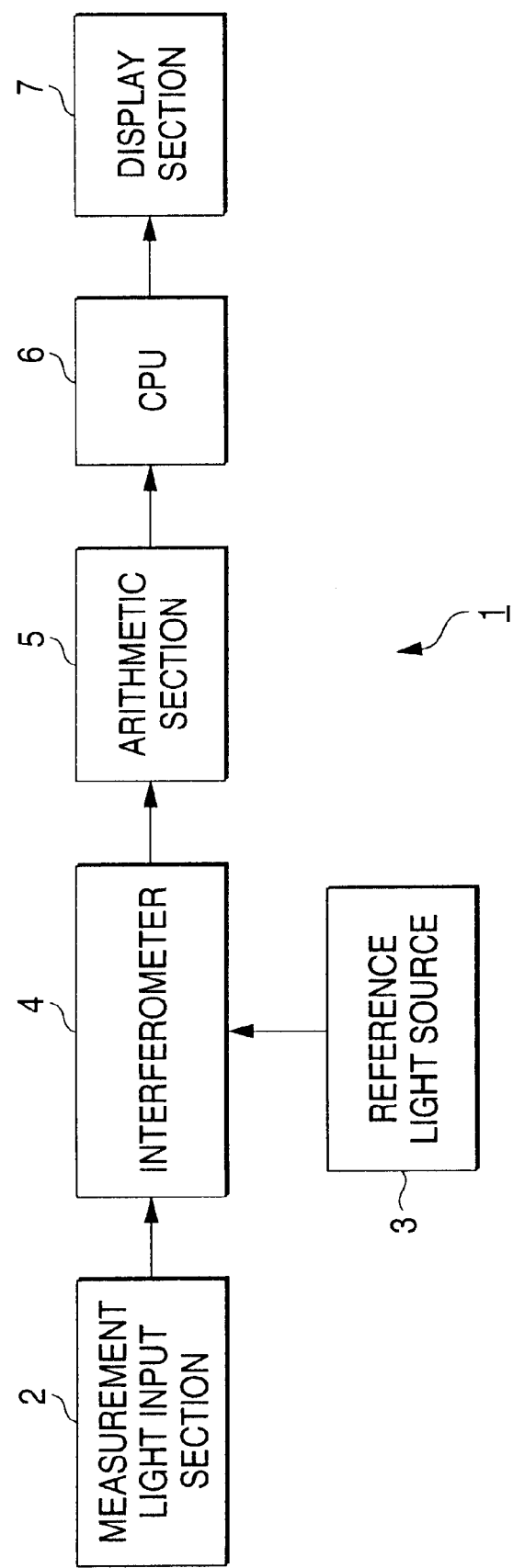
FIG. 1 is a block diagram to show the configuration of the main part of a wave meter 1 for measuring and monitoring an optical signal.

FIG. 1 is a block diagram to show the configuration of the main part of the wave meter 1 for measuring and monitoring an optical signal and is a diagram to show a signal flow between the main components of the wave meter 1 for measuring and monitoring an optical signal by arrows. In FIG. 1, the wave meter 1 comprises a measurement light input section 2, a reference light source 3, an interferometer 4, an arithmetic section 5, a CPU (central processing unit) 6, and a display section 7.

In FIG. 1, the measurement light input section 2 comprises a connector for connecting an optical fiber cable and the like and outputs measured light transmitted in the WDM via the optical fiber cable, which will be hereinafter called simply measured light, to the interferometer 4. A plurality of optical signals different in wavelength are multiplexed into the measured light.

The reference light source 3 is a light source made of a DFB (Distributed Feedback) laser for generating reference light of a predetermined wavelength for measuring the optical frequency, optical wavelength, and power (power amount) of the measured light (described later), and outputs the generated reference light to the interferometer 4.

The interferometer 4 is a unit for converting the measured light input from the measurement light input section 2 or the reference light input from the reference light source 3 into an electric signal proportional to the optical frequency and outputting the electric signal; it is made up of a prism lens and a reflecting mirror for preparing an interference waveform, a PD (Photodiode) for converting the interference waveform into an electric signal, and the like. The interferometer 4 first amplifies the measured light input from the measurement light input section 2 or the reference light input from the reference light source 3 by means of the prism lens, the reflecting mirror, etc., and causes interference for preparing an interference waveform. The PD detects the light amount of the interference waveform, etc., converts the interference waveform into an electric signal of a frequency proportional to the optical frequency (optical wavelength), and outputs the provided electric signal to the arithmetic section 5.

The arithmetic section 5 disassembles the electric signal input from the interferometer 4 into frequency components and outputs the frequency components to the CPU 6. The CPU 6 calculates (measures) the optical frequency, optical wavelength, and power (power amount) of the measured light based on the electric signal of the reference light, disassembled into the frequency components and the electric signal of the measured light, disassembled into the frequency components, and displays the optical frequency, optical wavelength, and power on the display section 7. The measuring principles of the optical frequency and the optical wavelength are derived from the following expressions (1) and (2): (The measuring principles are used with conventional wave meters and therefore will not be discussed in detail.)

$$f_{ml} = \frac{c}{f_i} \times f_{rl} \quad (1)$$

$$\lambda_{ml} = \frac{c}{f_{ml}} \quad (2)$$

where $f_{ml}$ is the optical frequency of measured light;

c is the light velocity;

f, is the frequency of interference waveform of reference light;

$f_{rl}$ is the optical frequency of reference light; and $\lambda_{ml}$ is the optical wavelength of measured light.

The CPU 6 performs the following monitor processing of measured light (see FIG. 4) as well as calculates (measures) the optical frequency, etc., of the measured light as described above: First, when an optical signal in WDM used as a monitor reference wave is input to the measurement light input section 2, the components of the wave meter 1 perform similar operation to measurement of measured light and finally an electric signal is input to the CPU 6, which then measures the power (power amount), the wavelength, etc., of each frequency component of the optical signal used as the monitor reference wave and stores the measurement values in a storage section (not shown).

Next, when the measured light being transmitted in the WDM is input to the measurement light input section 2 after the values of the monitor reference wave are set, the CPU 6 measures the power and the wavelength of the measured light and compares the power and the wavelength with those of the monitor reference wave already setup, thereby monitoring the measured light. At the time, if the power and the wavelength of the measured light differ from those of the monitor reference wave and the variation amount (shift) is equal to or greater than a predetermined threshold value, the CPU 6 determines that an anomaly occurs in the WDM transmission, and outputs display indicating the event to the display section 7. This is the monitor processing.

The processing involved in the measuring and monitor of the measured light, executed by the CPU 6 is executed in accordance with processing programs and the processing programs are stored in a storage section (not shown) implemented as RAM (Random Access Memory), etc., needless to say.

Figure 2:
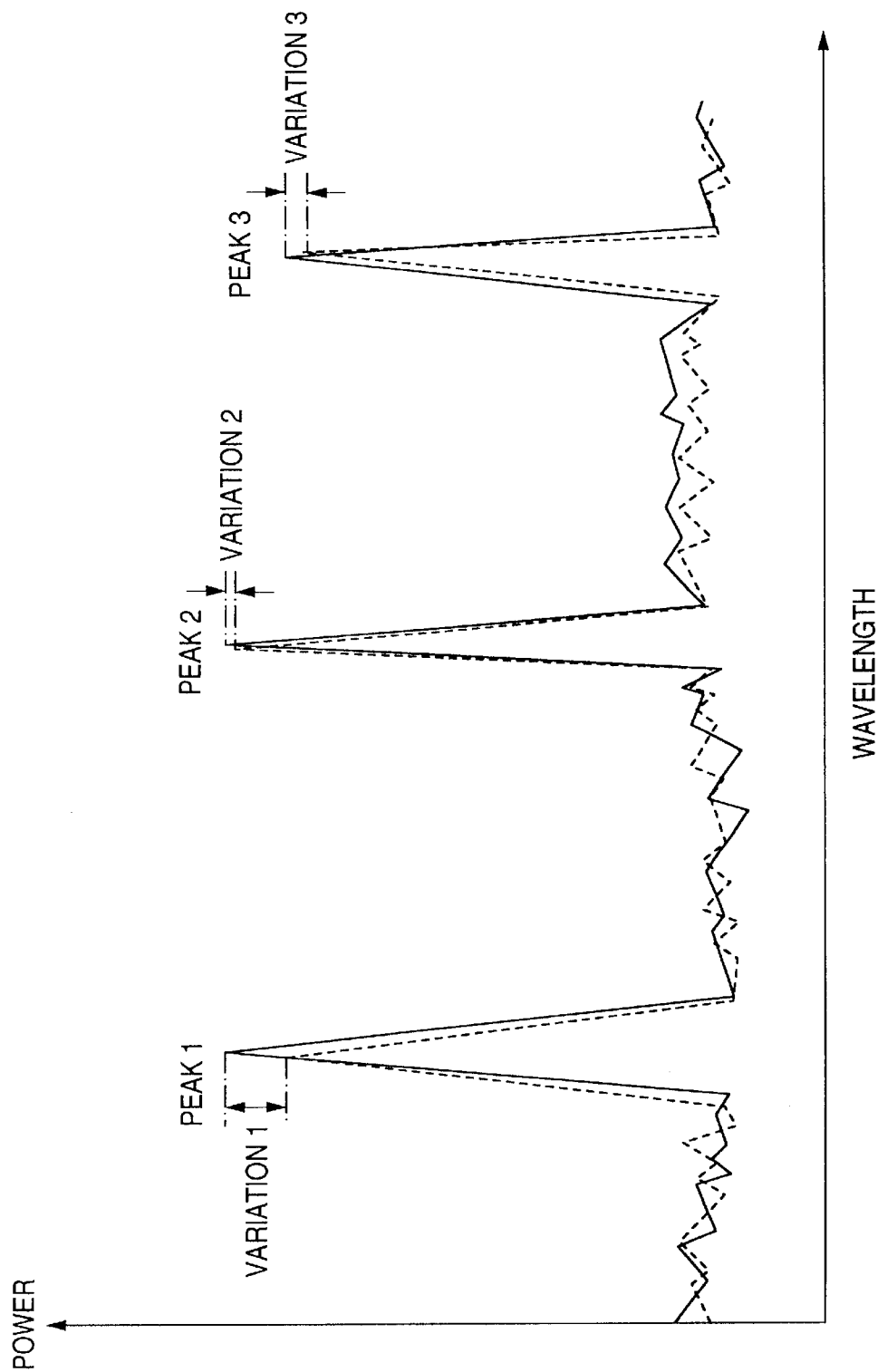
FIG. 2 is a drawing to show the waveform of measured light being transmitted in WDM and the wavelength of a monitor reference wave; it is a drawing to show the variation amounts involved in power.

Variations in the power and the wavelength of the measured light detected in the monitor processing will be discussed with reference to FIGS. 2 and 3. FIG. 2 is a drawing to show the waveform of the measured light being transmitted in WDM and the wavelength of the monitor reference wave; it is a drawing to show the variation amounts involved in the power. In FIG. 2, the vertical axis indicates the wavelength in nm (nanometer) units, for example, and the vertical axis indicates the power in dBm units, for example. The solid line indicates the waveform of the measured light under measurement and the dashed line indicates the waveform of the monitor reference wave.

In FIG. 2, three peaks 1 to 3 mean that three optical signals different in wavelength are contained in the measured light, namely, indicate WDM transmission with the three optical signals multiplexed. Noise is transmitted and propagated in valleys relative to peaks 1 to 3, for example, between peaks 1 and 2 and between peaks 2 and 3. The processing for detecting the peaks is already put to use in the conventional wave meters and therefore will not be discussed.

The power differences between the waveform of the measured light and the waveform of the monitor reference wave in three peaks 1 to 3, namely, variations 1 to 3 in FIG. 2 are the power variation amounts of the optical signals multiplexed in the WDM transmission.

Figure 3:
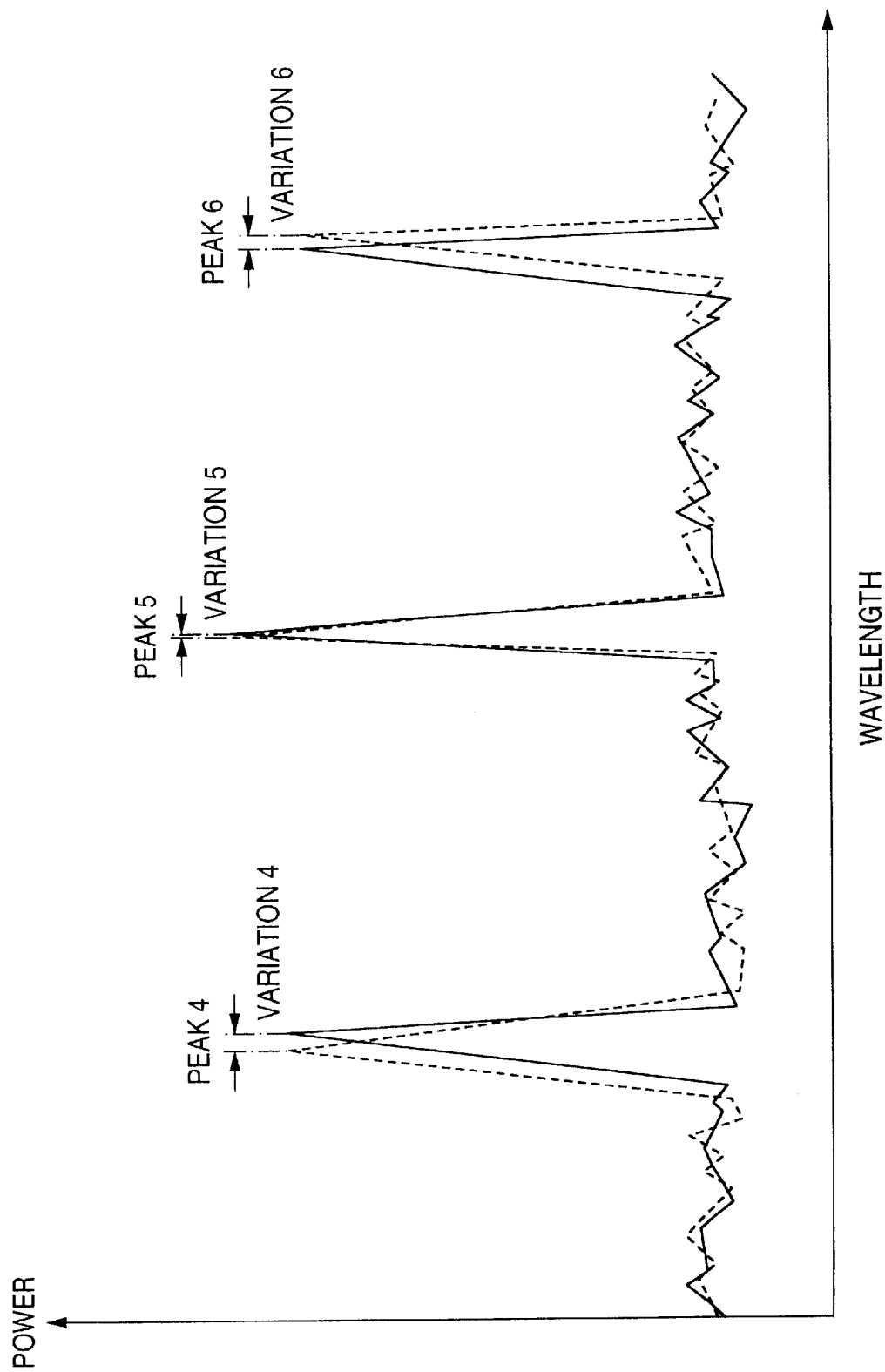
FIG. 3 is a drawing to show the waveform of measured light being transmitted in WDM and the wavelength of a monitor reference wave; it is a drawing to show the variation amounts involved in wavelength.

FIG. 3 is a drawing to show the waveform of the measured light being transmitted in WDM and the wavelength of the monitor reference wave; it is a drawing to show the variation amounts involved in the wavelength. As in FIG. 2, three peaks 4 to 6 are contained, the solid line indicates the waveform of the measured light under measurement, and the dashed line indicates the waveform of the monitor reference wave. The wavelength differences between the waveform of the measured light and the waveform of the monitor reference wave in three peaks 4 to 6, namely, variations 4 to 6 in FIG. 3 are the wavelength variation amounts of the optical signals multiplexed in the WDM transmission. The CPU 6 monitors the power variation amounts in FIG. 2 and the wavelength variation amounts in FIG. 3.

Next, the operation of the wave meter 1 will be discussed.

Figure 4:
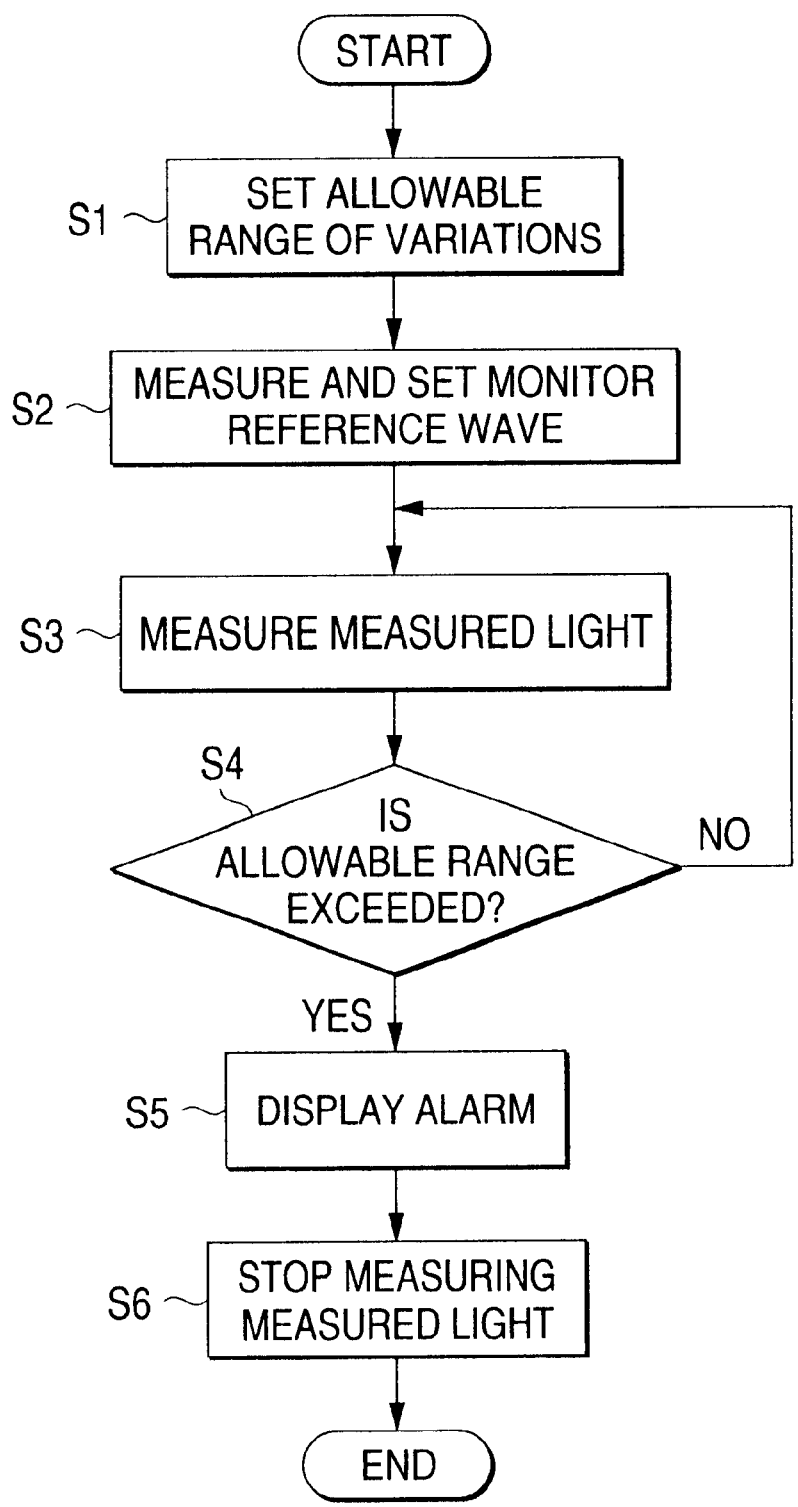
FIG. 4 is a flowchart to show the monitor processing operation of a CPU 6.
Figure 5:
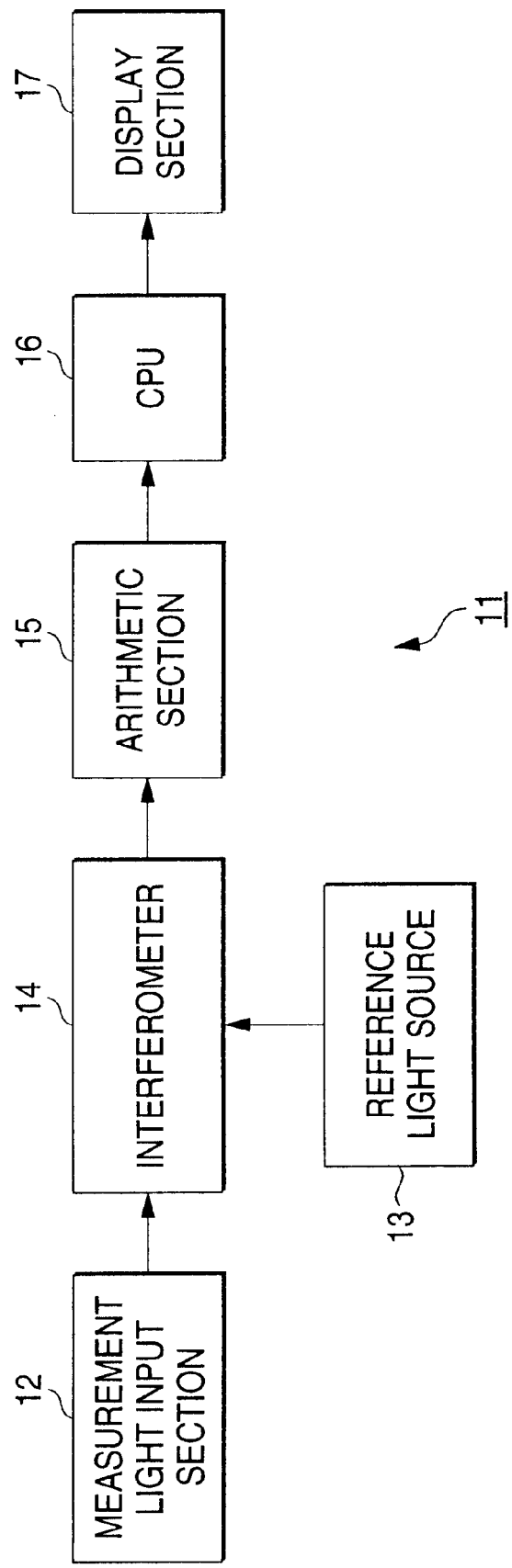
FIG. 5 is a block diagram to show the configuration of the main part of a wave meter 11 for measuring and monitoring an optical signal according to a second embodiment.

FIG. 4 is a flowchart to show the monitor processing operation of the CPU 6.

In FIG. 4, first, when a threshold value of the variation amounts of the measured light to be measured, namely, the allowable range of variations is input from an input section at step S1, the CPU 6 stores the allowable range in the storage section. Next, when an optical signal in WDM used as a monitor reference wave is input to the measurement light input section 2, the interferometer 4 prepares an interference waveform of the monitor reference wave and converts the interference waveform into an electric signal. Then, the arithmetic section 5 disassembles the electric signal into frequency components. The CPU 6 calculates (measures) the frequency (wavelength) and power from each frequency component of the electric signal and stores and sets the wavelength and power in the storage section as predetermined reference values of the monitor reference wave at step S2.

When measured light is input from the measurement light input section 2 after the monitor reference wave is set, an electric signal is input through the interferometer 4, etc., to the CPU 6 as in measurement of the monitor reference wave. The CPU 6 measures the measured light and displays the measurement result on the display section 7 at step S3.

Next, the CPU 6 detects a peak representing each of the multiplexed optical signals in the measured light and compares the wavelength and the power at the peak with those at the peak of the monitor reference wave. At step S4, the CPU 6 determines whether or not the value difference between the wavelength and the power at the peak of the monitor reference wave and those at the peak of the measured light exceeds the allowable range set at step S1.

If the value difference is within the allowable range, the CPU 6 goes to step 3 and continues to measure the measured light; if the value difference exceeds the allowable range, the CPU 6 displays an alarm message indicating that the allowable range is exceeded on the display section 7 at step S5 stops measuring the measured light at step S6 and terminates the monitor processing.

As described above, according to the wave meter 1 incorporating the invention, a comparison is made between the peak of the waveform of the monitor reference wave and that of the measured light, namely, the wavelength and power of the monitor reference wave and those of each of the multiplexed optical signals, whereby an anomaly occurring in the optical signal being transmitted in the WDM can be monitored. Thus, each optical signal can be monitored in the WDM transmission with a plurality of optical signals multiplexed, so that a wave meter effective for maintenance of the WDM transmission, etc., can be provided.

The invention is not limited to the specific embodiment and various changes in the shape, size, and arrangement of parts may be resorted to without departing from the spirit of the invention. For example, the peaks of the measured light may be compared with the corresponding peaks of the monitor reference wave, whereby the multiplexed optical signals may be monitored, an optical signal in which an anomaly occurs may be determined, and a message indicating the fact may be displayed. In this case, various actions can be taken; for example, the abnormal optical signal is removed, only the normal optical signals are multiplexed, and the WDM transmission is continued.

In the description of the embodiment, if an anomaly occurs, a message is displayed on the display section 7; to install the wave meter incorporating the invention at a relay base of an optical fiber cable, etc., it is necessary to monitor the WDM transmission state at a remote location. Thus, the wave meter may contain a communication unit for sending a message indicating occurrence of an anomaly to the outside using wireless communications or the optical fiber cable under monitor.

Second embodiment

Referring now to FIGS. 5–8, a second embodiment of a wave meter 11 incorporating the invention will be shown.

The wave meter 11 incorporating the invention is a wave meter for measuring and monitoring the wavelength of an optical signal, etc., in WDM transmission; each of the optical signals multiplexed is monitored by checking whether or not the wavelength interval between the optical signals is a predetermined interval and whether or not each optical signal has a predetermined wavelength.

The wave meter 11 comprises a measurement light input section 12, a reference light source 13, an interferometer 14, an arithmetic section 15, a CPU (central processing unit) 16, and a display section 17. The measurement light input section 12, the reference light source 13, the interferometer 14, the arithmetic section 15, and the display section 17 have the same configuration and function as those of the measurement light input section 2 and the reference light source 3, the interferometer 4, the arithmetic section 5, and the display section 7 of the first embodiment, respectively.

The CPU 16 performs the following monitor processing of measured light (see FIG. 8) as well as calculates (measures) the optical frequency, etc., of the measured light as described above: First, after measuring the measured light, the CPU 16 detects each of the optical signals multiplexed based on the wavelength and the power of the measured light by detecting the peak value of the power as described below. The process is carried out in conventional wave meters and therefore will not be discussed in detail.

After detecting and specifying each of the optical signals multiplexed, the CPU 16 determines whether or not the wavelength interval between the optical signals is a predetermined wavelength interval. The CPU 16 also determines whether or not each optical signal is within a predetermined wavelength width. The optical signals in the WDM transmission are multiplexed at a predetermined wavelength interval and with a predetermined wavelength and therefore if the wavelength interval is exceeded or the optical signal is not within the predetermined wavelength width, an anomaly can be determined to occur.

The processing involved in the measuring and monitor of the measured light, executed by the CPU 16 is executed in accordance with processing programs and the processing programs are stored in a storage section (not shown) implemented as RAM (Random Access Memory), etc., needless to say.

Figure 6:
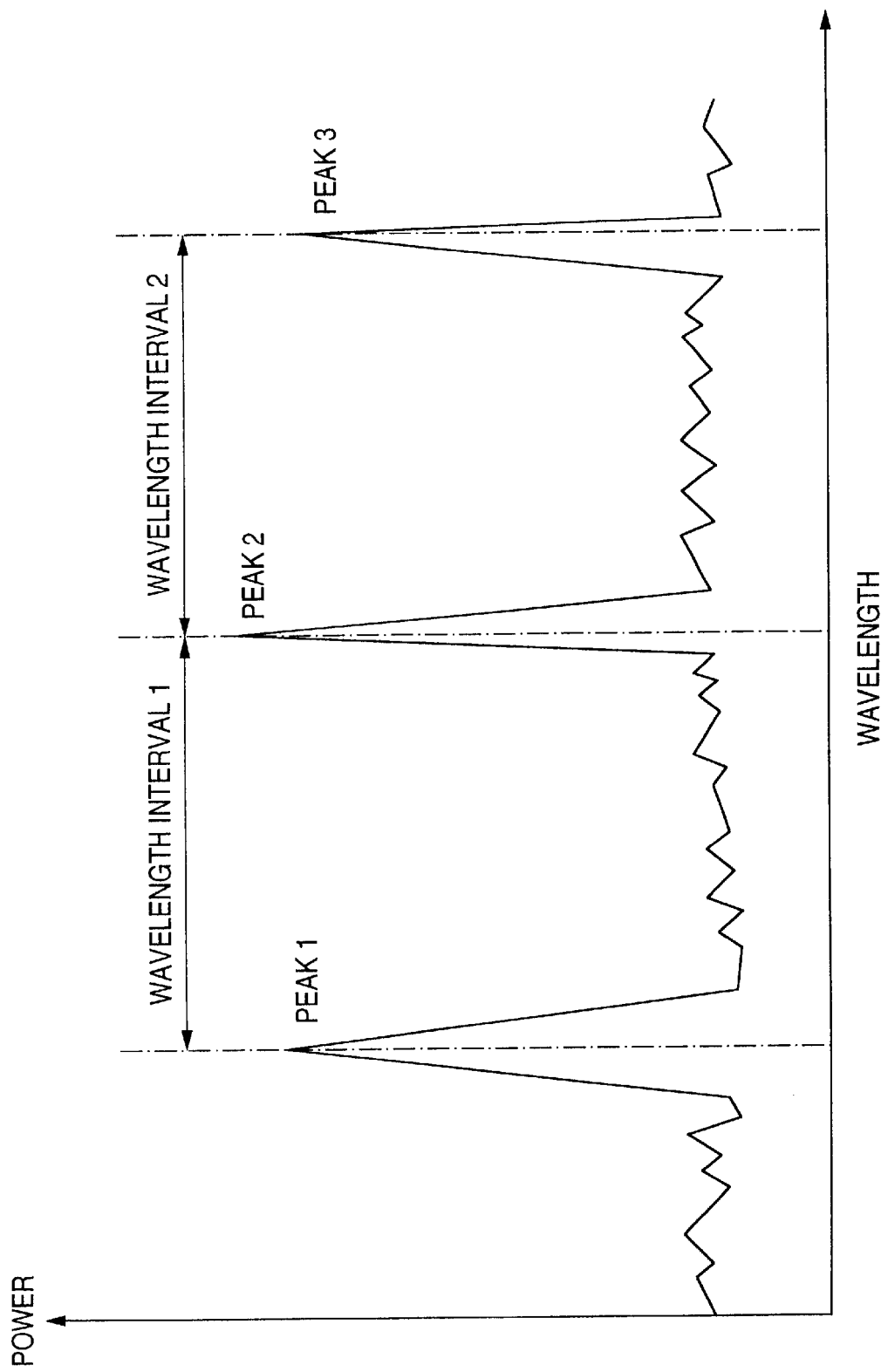
FIG. 6 is a drawing to show the waveform of the measured light being transmitted in WDM; it is a drawing to show the wavelength intervals between the optical signals multiplexed.

The wavelength interval and the wavelength width of each optical signal used as the determination reference in the monitor processing will be discussed with reference to FIGS. 6 and 7. FIG. 6 is a drawing to show the waveform of the measured light being transmitted in WDM; it is a drawing to show the wavelength intervals between the optical signals multiplexed. In FIG. 6, the vertical axis indicates the wavelength in nm (nanometer) units, for example, and the verticalaxis indicates the power in dBm units, for example.

In FIG. 6, three peaks 1 to 3 mean that three optical signals different in wavelength are contained in the measured light, namely, indicate WDM transmission with the three optical signals multiplexed. Noise is transmitted and propagated in valleys relative to peaks 1 to 3, for example, between peaks 1 and 2 and between peaks 2 and 3. The wavelength interval between peaks 1 and 2 and that between peaks 2 and 3 are the wavelength intervals in the monitor processing.

Figure 7:
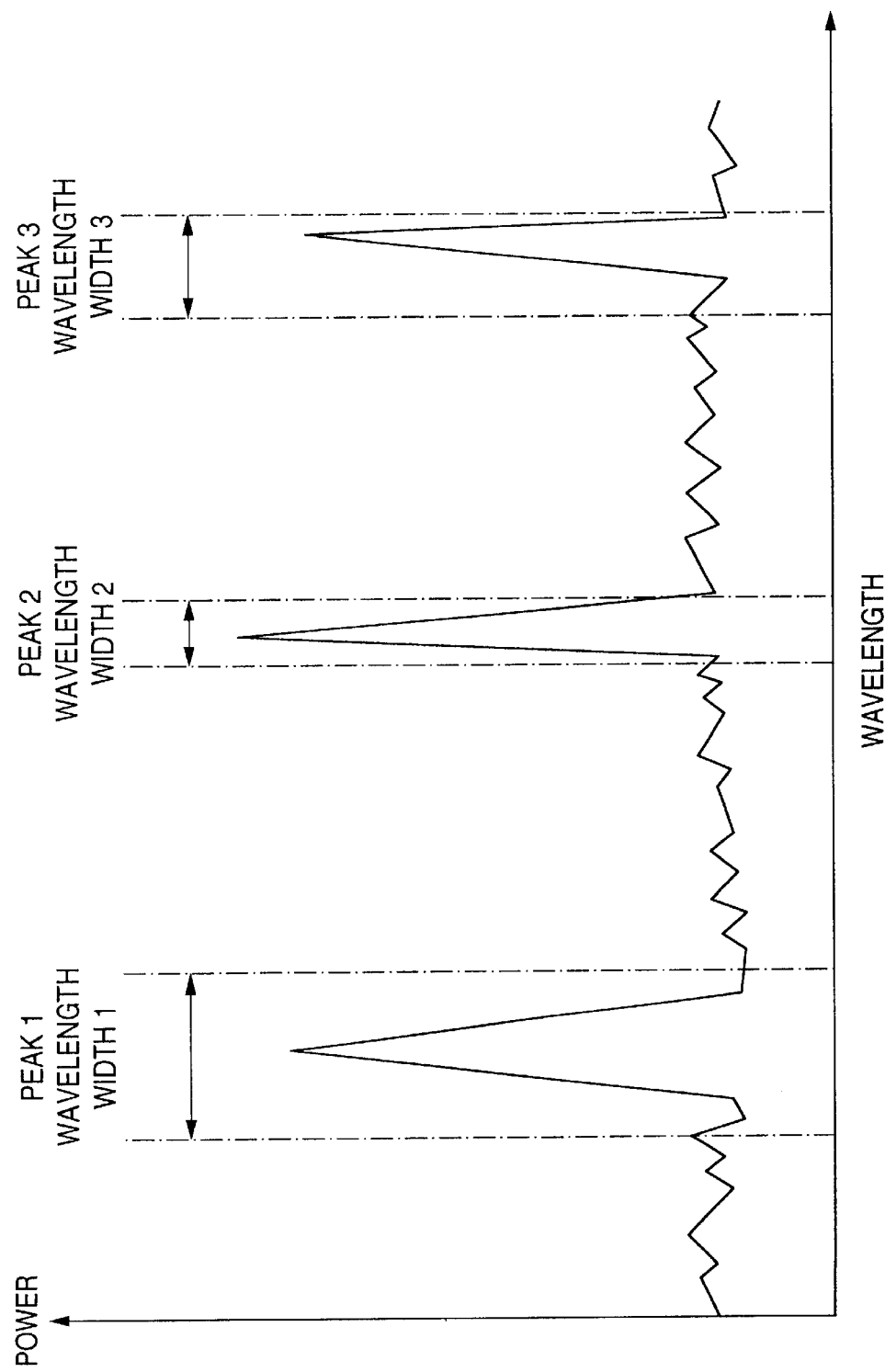
FIG. 7 is a drawing to show the waveform of the measured light being transmitted in WDM; it is a drawing to show the wavelength widths in which the optical signals multiplexed can exist.

FIG. 7 is a drawing to show the waveform of the measured light being transmitted in WDM; it is a drawing to show the wavelength widths in which the optical signals multiplexed can exist. The measured light in FIG. 7 contains three peaks 1 to 3 similar to those in FIG. 6. The optical signals in the WDM transmission are multiplexed into light of a predetermined wavelength. However, if the wavelength of each optical signal varies exceeding the specification range, the signal quality is degraded remarkably. Therefore, whether or not the wavelength of each optical signal is within the specifications of the WDM transmission is at stake. That is, each optical signal (peak) needs to exist in a predetermined wavelength width and whether or not each optical signal exists in the predetermined wavelength width is checked in the monitor processing executed by the CPU 16.

Next, the operation of the wave meter 11 will be discussed.

Figure 8:
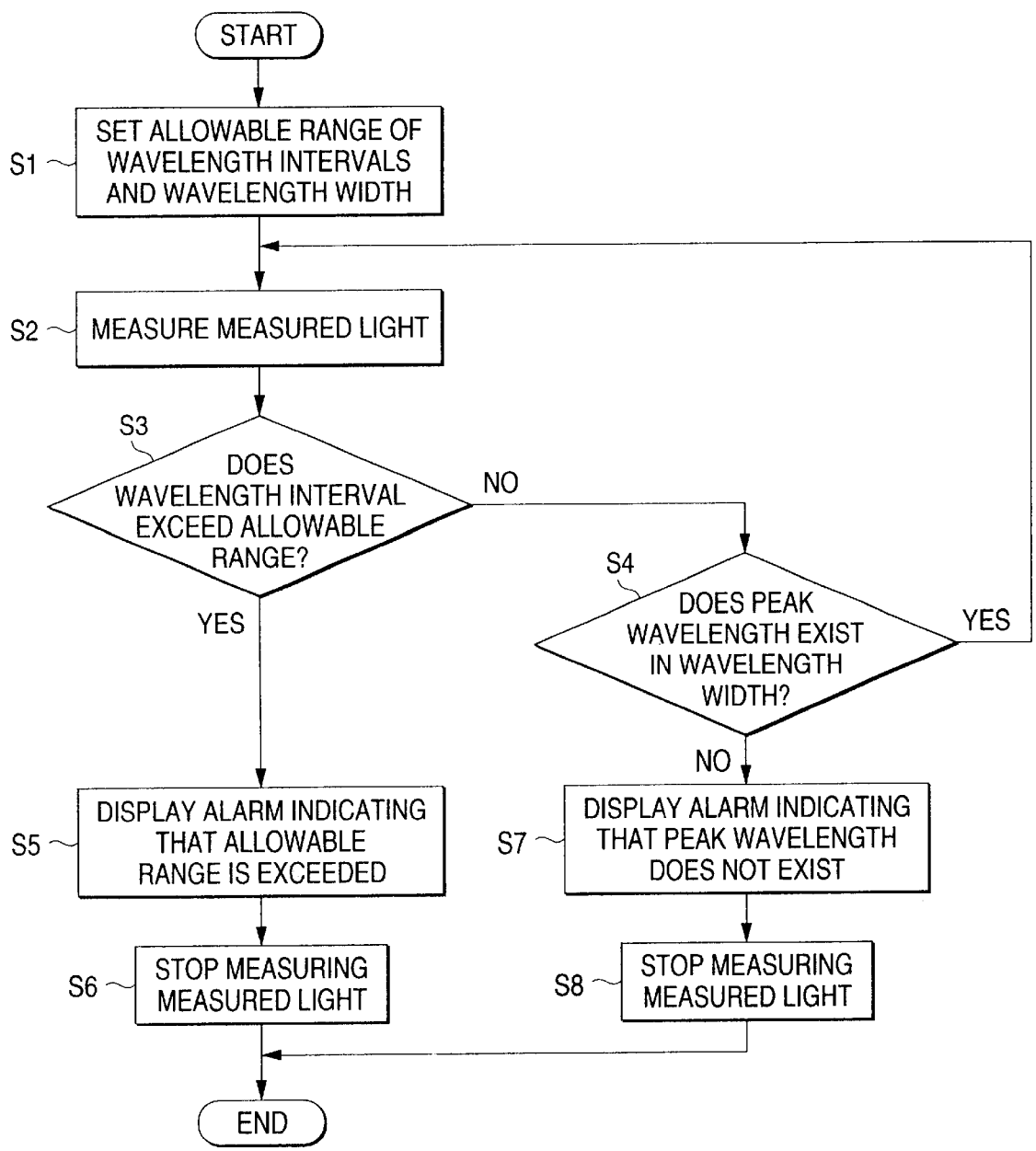
FIG. 8 is a flowchart to show the monitor processing operation of a CPU 16.

FIG. 8 is a flowchart to show the monitor processing operation of the CPU 16.

In FIG. 8, first, when the allowable range of the wavelength intervals between the optical signals multiplexed into measured light and the wavelength width in which each optical signal can exist are input from an input section (not shown) at step S1, the CPU 16 stores the input allowable range of the wavelength intervals and the input wavelength width in the storage section. Next, when the measured light is input to the Measurement light input section 12, the Interferometer 14 prepares an interference waveform of the measured light and converts the interference waveform into an electric signal. Then, the Arithmetic section 15 disassembles the electric signal into frequency components. The CPU 16 calculates the frequency (wavelength) and power from each frequency component of the electric signal and measures the measured light at step S2. When measuring the measured light, the CPU 16 detects the peak value of the power of the measured light, thereby specifying each of the optical signals multiplexed.

Next, at step S3, the CPU 16 determines whether or not the wavelength interval between the specified optical signals is within the allowable range of the wavelength intervals set at step S1. If the wavelength interval is within the allowable range, the CPU 16 goes to step S4 and further determines whether or not each specified optical signal exists within the wavelength width set at step S1. If each optical signal exists within the wavelength width, the CPU 16 goes to step S2 and continues to measure the measured light.

If it is not determined at step S3 that the wavelength interval is within the allowable range, the CPU 16 displays an alarm message indicating that the wavelength interval between the optical signals exceeds the allowable range on the display section 17 at step S5 stops measuring the measured light at step S6 and terminates the monitor processing.

If it is not determined at step S4 that each optical signal does not exist within the setup wavelength width, the CPU 16 displays an alarm message indicating that the optical signal does not exist within the setup wavelength width on the display section 17 at step S7, stops measuring the measured light at step S8, and terminates the monitor processing.

As described above, according to the wave meter 11 incorporating the invention, whether or not the wavelength interval between the optical signals multiplexed is the predetermined interval and whether or not each optical signal exists within the predetermined wavelength width are checked in the monitor processing executed by the CPU 16, so that the optical signals multiplexed at the WDM transmission time can be monitored.

The invention is not limited to the specific embodiment and various changes in the shape, size, and arrangement of parts may be resorted to without departing from the spirit of the invention. For example, in the description of the embodiment, if an anomaly occurs, a message is displayed on the display section 17; to install the wave meter incorporating the invention at a relay base of an optical fiber cable, etc., it is necessary to monitor the WDM transmission state at a remote location. Thus, the wave meter may contain a communication unit for sending a message indicating occurrence of an anomaly to the outside using wireless communications or the optical fiber cable under monitor.

According to the first aspect of the invention, whether or not the signal light continuously measured by the measurement means is within the range of the allowable variation amount relative to the measurement reference is determined, so that a wave meter for checking whether or not transmission is executed within the range in the specifications of the predetermined system can be provided, for example.

According to the second aspect of the invention, in addition to the advantage of the invention, each of the optical signals multiplexed is monitored, so that more detailed monitor can be executed for determining an optical signal in which an anomaly occurs, for example, and a message indicating the fact can be displayed. In this case, various actions can be taken; for example, the abnormal optical signal is removed, only the normal optical signals are multiplexed, and the transmission is continued.

According to the third and fourth aspects the invention, the measurement reference and the allowable variation amount are the power amount or the wavelength of each optical signal. Thus, it is made possible to set the measurement reference and the allowable variation amount using a waveform graph of optical signal with the power amount on the vertical axis and the wavelength on the horizontal axis, for example.

According to the fifth aspect of the invention, the measurement reference light is input, whereby it is made possible to easily set the measurement reference.

According to the sixth aspect of the invention, a wave meter applied to the WDM used as multiplexing of optical signals can be provided.

According to the seventh to ninth aspects of the invention, a wave meter for checking whether or not the wavelength interval between the optical signals multiplexed is a predetermined interval and whether or not each optical signal has a predetermined wavelength can be provided.

According to the tenth aspect of the invention, a wave meter can be provided for providing information in such a manner that an alarm message is displayed on the display section or a beeper produces a sound, for example, if an anomaly of the signal light is detected.

According to the eleventh aspect of the invention, a wave meter applied to the WDM used as multiplexing of optical signals can be provided.

What is claimed is:

1. A wave meter for measuring transmitted signal light including a plurality of optical signals multiplexed by a predetermined system, the wave meter comprising:

reference setting means for setting a measurement reference of the signal light based on the predetermined system;

variation amount setting means for setting an allowable variation amount of the signal light upon transmission;

measurement means for continuously measuring the transmitted signal light; and determination means for determining whether or not the measurement result of the signal light provided by the measurement means is within the range of the allowable variation amount set by the variation amount setting means relative to the measurement reference set by the reference setting means, wherein if the determination means does not determine that the signal light is within the range of the allowable variation amount relative to the measurement reference, an anomaly of the signal light is detected.

2. The wave meter as claimed in claim 1 wherein the reference setting means sets the measurement reference of each of the optical signals multiplexed into the signal light;

the variation amount setting means sets the allowable variable amount of each of the optical signals multiplexed into the signal light;

the measurement means continuously measures the transmitted signal light and determines each of the optical signals multiplexed into the signal light; and the determination means determines whether or not each of the optical signals determined by the measurement means is within the range of each corresponding allowable variation amount set by the variation amount setting means relative to each corresponding measurement reference set by the reference setting means.

3. The wave meter as claimed in claim 2 wherein the reference setting means sets the power amount of each of the optical signals as the measurement reference of each of the optical signals multiplexed into the signal light, and wherein the variation amount setting means sets the allowable variation amount of the power amount of each of the optical signals multiplexed into the signal light.

4. The wave meter as claimed in claim 2 wherein the reference setting means sets the wavelength of each of the optical signals as the measurement reference of each of the optical signals multiplexed into the signal light, and wherein the variation amount setting means sets the allowable variation amount of the wavelength of each of the optical signals multiplexed into the signal light.

5. The wave meter as claimed in claim 1 wherein the reference setting means sets the measurement reference of the signal light based on measurement reference light of signal light based on a predetermined system input.

6. The wave meter as claimed in claim 1 wherein multiplexing the optical signals by the predetermined system is wave division multiplexing.

7. The wave meter as claimed in claim 1, wherein multiplexing the optical signals by the predetermined system is wave division multiplexing.

8. A wave meter for measuring transmitted signal light including a plurality of optical signals multiplexed by a predetermined system, the wave meter comprising:

setting means for setting an allowable variation amount relative to the wavelength interval between the optical signals multiplexed into the signal light;

measurement means for continuously measuring the transmitted signal light;

specification means for specifying each of the optical signals multiplexed into the signal light based on the measurement result of the signal light provided by the measurement means; and determination means for determining whether or not the wavelength interval between the optical signals specified by the specification means is within the range of the allowable variation amount set by the setting means, wherein if the determination means does not determine that the wavelength interval between the optical signals is within the range of the allowable variation amount set by the setting means, an anomaly of the signal light is detected.

9. The wave meter as claimed in claim 8, wherein if an anomaly of the signal light is detected, an external system is informed of the anomaly.

10. A wave meter for measuring transmitted signal light including a plurality of optical signals multiplexed by a predetermined system, the wave meter comprising:

setting means for setting an allowable variation amount relative to the wavelengths of the optical signals multiplexed into the signal light;

measurement means for continuously measuring the transmitted signal light;

specification means for specifying each of the optical signals multiplexed into the signal light based on the measurement result of the signal light provided by the measurement means; and determination means for determining whether or not the wavelength of each optical signal specified by the specification means is within the range of the allowable variation amount set by the setting means, wherein if the determination means does not determine that the wavelength of each optical signal is within the range of the allowable variation amount set by the setting means, an anomaly of the signal light is detected.

11. The wave meter as claimed in claim 10, wherein if an anomaly of the signal light is detected, an external system is informed of the anomaly.

12. A wave meter for measuring transmitted signal light comprising a plurality of optical signals multiplexed by a predetermined system, the wave meter comprising:

setting means for setting allowable variation amounts relative to the wavelength interval between the optical signals multiplexed into the signal light and the wavelengths of the optical signals;

measurement means for continuously measuring the transmitted signal light;

specification means for specifying each of the optical signals multiplexed into the signal light based on the measurement result of the signal light provided by the measurement means; and determination means for determining whether or not the wavelength interval between the optical signals specified by the specification means and the wavelength of each optical signal specified by the specification means are within the range of the allowable variation amounts set by the setting means, wherein if the determination means does not determine that the wavelength of each optical signal is within the range of the allowable variation amount set by the setting means, an anomaly of the signal light is detected.

13. The wave meter as claimed in claim 12, wherein if an anomaly of the signal light is detected, an external system is informed of the anomaly.

* * * * *